United States Patent [19]
Venczel

[11] Patent Number: 5,272,466
[45] Date of Patent: Dec. 21, 1993

[54] METHOD AND APPARATUS FOR DEFINING A PERIMETER

[75] Inventor: John Venczel, Ossining, N.Y.

[73] Assignee: Freedom Fence, Inc., North Adams, Mass.

[21] Appl. No.: 794,966

[22] Filed: Nov. 20, 1991

[51] Int. Cl.⁵ ............ G08B 23/00; A01K 15/00; H01Q 7/00
[52] U.S. Cl. .................................. 340/573; 343/748
[58] Field of Search ............ 340/573, 551, 664; 324/260-261; 119/29; 307/131; 361/287, 300; 334/5-6, 39, 86; 333/205, 207, 209, 263; 343/748, 788, 861; 455/120, 121, 123, 107, 150.1, 154.1, 170.1, 193.1, 195.1

[56] References Cited

U.S. PATENT DOCUMENTS

| | | | |
|---|---|---|---|
| 3,803,571 | 4/1974 | Luz | 340/573 X |
| 3,866,012 | 2/1975 | Tauern et al. | 219/99 |
| 4,087,791 | 5/1978 | Lemberger | 340/573 X |
| 4,095,198 | 6/1978 | Kirby | 333/32 |
| 4,136,338 | 1/1979 | Antenore | 340/551 |
| 4,196,394 | 4/1980 | Adams | 455/107 X |
| 4,213,122 | 7/1980 | Rotman et al. | 340/552 |
| 4,409,590 | 10/1983 | Baker | 340/552 X |
| 4,766,847 | 8/1988 | Venczel et al. | 119/29 |
| 5,053,768 | 10/1991 | Dix, Jr. | 340/988 |

Primary Examiner—John K. Peng
Assistant Examiner—Thomas J. Mullen, Jr.
Attorney, Agent, or Firm—Wolf, Greenfield & Sacks

[57] ABSTRACT

An apparatus for confining an animal within a predetermined area is provided. A loop of electrical wire defining the predetermined area has an AC current from a transmitter passed therethrough. A receiver is tuned to receive a magnetic field generated by the loop and includes circuitry for signalling the animal when the location of the receiver is at a predetermined distance from the electrical wire. The transmitter includes a tuning circuit for reducing the effective impedance of the loop and for potentially eliminating the shape dependence of the loop by capacitively offsetting the inductive reactance portion of the loop impedance.

16 Claims, 2 Drawing Sheets

METHOD AND APPARATUS FOR DEFINING A PERIMETER

FIELD OF THE INVENTION

This invention relates generally to an animal confining/exclusion apparatus which employs a loop of electrical wire through which AC current is passed, and more particularly, to such apparatus which employs a tuning circuit for offsetting a portion of the impedance in the loop.

BACKGROUND OF THE INVENTION

In the maintenance and/or training of both domestic and wild animals, it is frequently desirable to confine the animals within certain areas and/or to keep the animals out of certain areas. Above ground fences have been commonly employed for this purpose. In certain locations and areas, however, the use of above ground fences is impractical, is prohibited, or is otherwise not possible. One known alternate to above ground fences, where for any reason it is decided that such fences are not to be used for animal confinement or exclusion, is to provide an audible warning signal and mild electric shock to the animal when the animal approaches a boundary line defined by a loop of electrical wire surrounding the area.

This known method is taught for example in U S. Pat. No. 4,766,847. In accordance with the teachings of this patent, an electric antenna in the form of a loop of electrical wire is layed out to define the boundary of the confining/exclusion (hereinafter in both the descriptions and claims, confining/exclusion will be collectively referred to as "confinement") area. AC current is passed through the wire, generating a surrounding magnetic field at a sub-broadcast band frequency.

A receiver, tuned to the frequency of this field, is attached to the collar of the animal. The receiver includes an electronic circuit which senses the intensity of the magnetic field and generates a selected voltage signal when the detected magnetic field signal strength exceeds a predetermined level, corresponding to a desired fixed distance from the wire. This voltage signal causes a mild electric shock to be applied to the animal. In addition, the electronic circuit preferably produces a warning signal, in the form of a high pitched noise, to alert the animal prior to shock generations.

A typical arrangement of such animal confinement apparatus can be seen, for example, in FIG. 1, which shows a dog 10 wearing a collar 14 having a receiver 12 attached thereto. An AC power transmitter (not shown) is, for example, located within garage 16 of house 18, but may be located in any convenient location. The transmitter is preferably powered from the household AC outlet of 115 volts AC. Current carrying electrical wire is connected at both ends to the transmitter output terminals and laid out around the house to form a closed loop 20 of any desired shape, within which the dog 10 is to be confined. The two ends of the wire are preferably interwound in a twisted arrangement 22 within the confinement area to cancel out the magnetic field generated around each conductor within this area. The AC transmitter generates an AC current which passes through the loop 20.

As a consequence of the AC current in the electrical wire loop 20, an alternating magnetic field is generated in the vicinity thereof. The intensity of the magnetic field is inversely proportional to the distance from the electrical wire 20 for any given value of AC current in the wire. In addition, the intensity of the magnetic field, at a given distance from the wire 20, is directly proportional to the AC current in the wire. The receiver 12 includes circuitry for sensing the strength of the magnetic field, for comparing this strength to a threshold level of magnetic field strength, and for generating a warning signal followed by a mild electric shock when the signal strength exceeds this threshold level. This threshold level of magnetic field strength corresponds to a predetermined distance from the electrical wire 20 for a given loop. The current in loop 20 can be calculated by Ohm's law, i.e. by dividing the transmitter voltage by the impedance of the loop.

The method described in the aforementioned patent suffers from two related deficiencies. These deficiencies are a relatively high impedance in the loop 20 which increases the power consumption to operate the apparatus and the fact that this impedance varies with the size and shape of the loop, creating a problem in assuring that the magnetic field of the loop will be sufficient to trigger the receiver at a desired distance in all applications. While resistive impedance can be reduced by increasing the diameter of the wire used for the loop, resistive impedance has been found, in accordance with the teachings of this invention, to normally account for less than ten percent of the loop impedance. Because of the nature of the apparatus and the low frequencies at which the apparatus is operated, capacitive impedance is normally negligible. The remaining over ninety percent of the loop impedance is therefore inductive impedance which is relatively unaffected by change in wire gauge and which varies with changes in the shape of the loop. These loop impedance variations are often difficult to compute. The inductive impedance also increases as a more or less linear function of loop length, requiring that more current be applied to the loop to maintain the field required to trigger the receiver at a desired distance as the loop size is increased. The magnetic field strength and the operation parameters of the apparatus in this prior art method are, thus, loop size and loop-shape dependent. Further, the increased power required to overcome the inductive impedance particularly for large loops is not desirable for a number of reasons. First, increasing power output, and thus power consumption, makes the apparatus more expensive to use. Since the apparatus is typically operated continuously, this cost increase can be substantial. Second, increased power output from the transmitter requires a greater capacity transmitter and/or a power amplifier, resulting in higher hardware costs, and bulkier installations.

SUMMARY OF THE INVENTION

It is, therefore, a primary object of the present invention to provide an improved, more efficient animal confinement apparatus.

A more specific object of the invention is to provide an animal confinement apparatus which requires less power to operate for all loop sizes, and in particular for large loop sizes.

Another object of the invention is to provide an animal confinement apparatus which minimizes changes in loop impedance as a result of changes in the size and/or shape of the confinement area, thus minimizing the effect of such changes on permitted distances from the loop and on loop power input requirements.

In accordance with the aforementioned objects, the present invention provides an animal confinement apparatus which utilizes a loop of electrical wire of selectable size and shape which defines the confinement area. A transmitter circuit is employed for generating an AC current which is connected to pass through the loop. A receiver, worn by the animal, is tuned to the frequency of the magnetic field induced around the loop. The receiver, in response to the received magnetic field, generates a warning signal in the form of a high-pitched sound or mild electrical shock which is applied to the animal, or both, when the location of the receiver is within a predetermined distance from the electrical wire.

The transmitter circuit includes a circuit portion for generating the AC current and a tuning circuit for offsetting the inductive reactance portion of the impedance in the loop. More particularly, the tuning circuit introduces an appropriate capacitive impedance in series with the loop inductive impedance to substantially balance out such inductive impedance. In one embodiment, the tuning circuit includes a plurality of capacitors, each having a different capacitance value. The tuning circuit, in this embodiment, also includes a selector, manually operable, for electrically connecting any one of the capacitors, in series, between the circuit portion which generates the AC current and the loop. The tuning circuit also includes a current measuring element, such as a ammeter or a light-emitting diode, electrically connected to the loop for indicating the AC current in the loop. The tuning circuit provides means for offsetting the inductive reactance portion of impedance in the loop.

The foregoing and other objects, features and advantages of the invention will be apparent from the following more particular description of a preferred embodiment as illustrated in the accompanying drawings.

IN THE DRAWINGS

DETAILED DESCRIPTION OF THE PREFERRED EMBODIMENT

Figure 1:
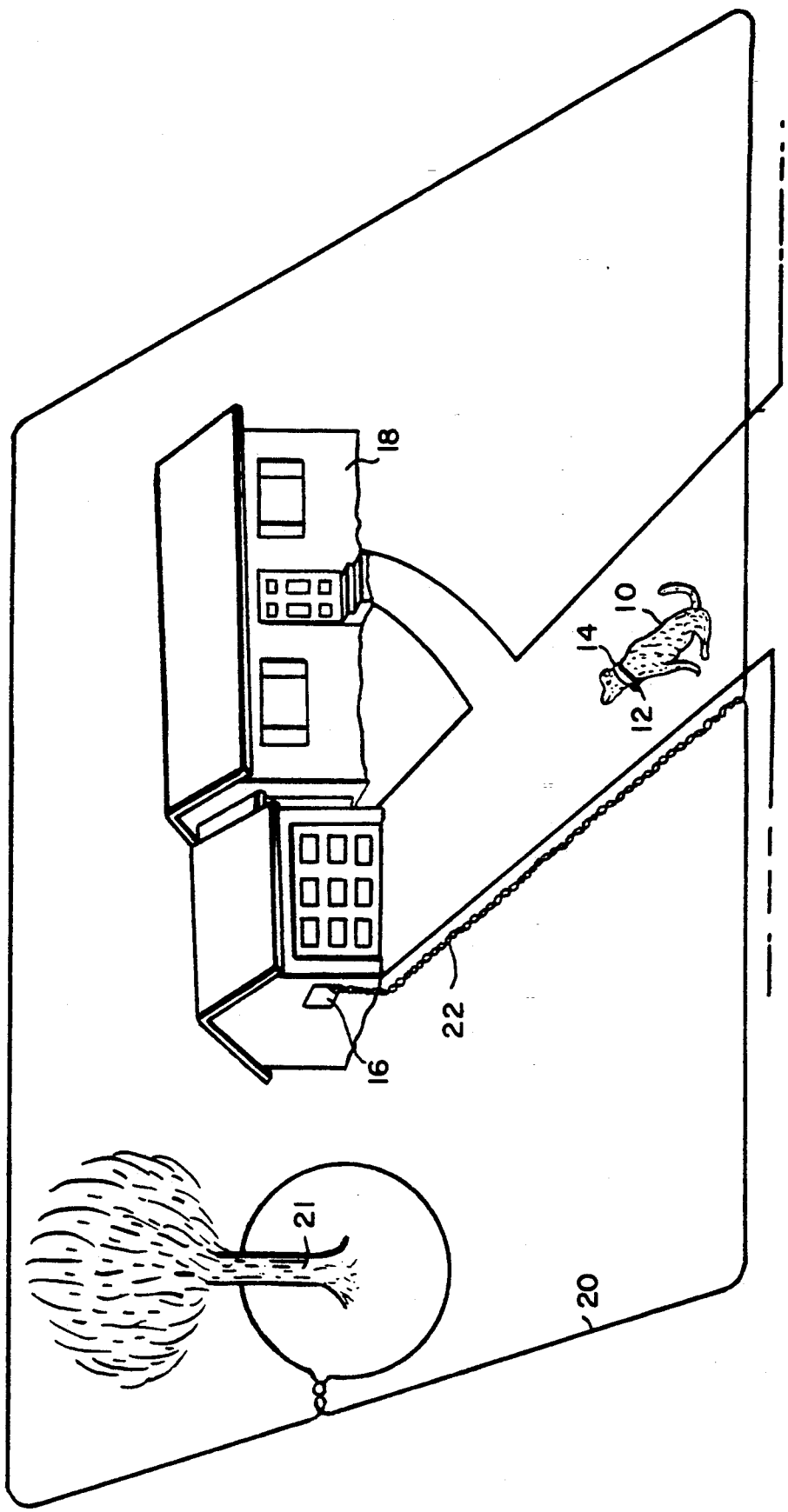
FIG. 1 is a simplified, top down view of a typical arrangement of the animal confinement apparatus including the loop of electrical wire.

Animal confinement apparatuses are used to confine animals within a predetermined area as defined by a loop of electrical wire. As illustrated in FIG. 1, which shows a typical arrangement for such an animal confinement apparatus, electrical wire loop 20 is shown surrounding house 18 to confine dog 10 within the area defined by loop 20. Such apparatus may also be utilized to exclude the animal from a selected area, for example the area around tree 21.

The problems inherent in such prior art animal confining apparatuses have been discussed above. The present invention overcomes these problems by providing a tuning circuit to select an appropriate capacitance to be placed in series with the loop to offset the inductive reactance portion of the impedance therein. It has been found that this effectively eliminates approximately 90% of the effects of the inductive impedance on the loop, significantly reducing power requirements for all loop sizes and eliminating the cause of impedance variations due to loop shape.

Figure 2:
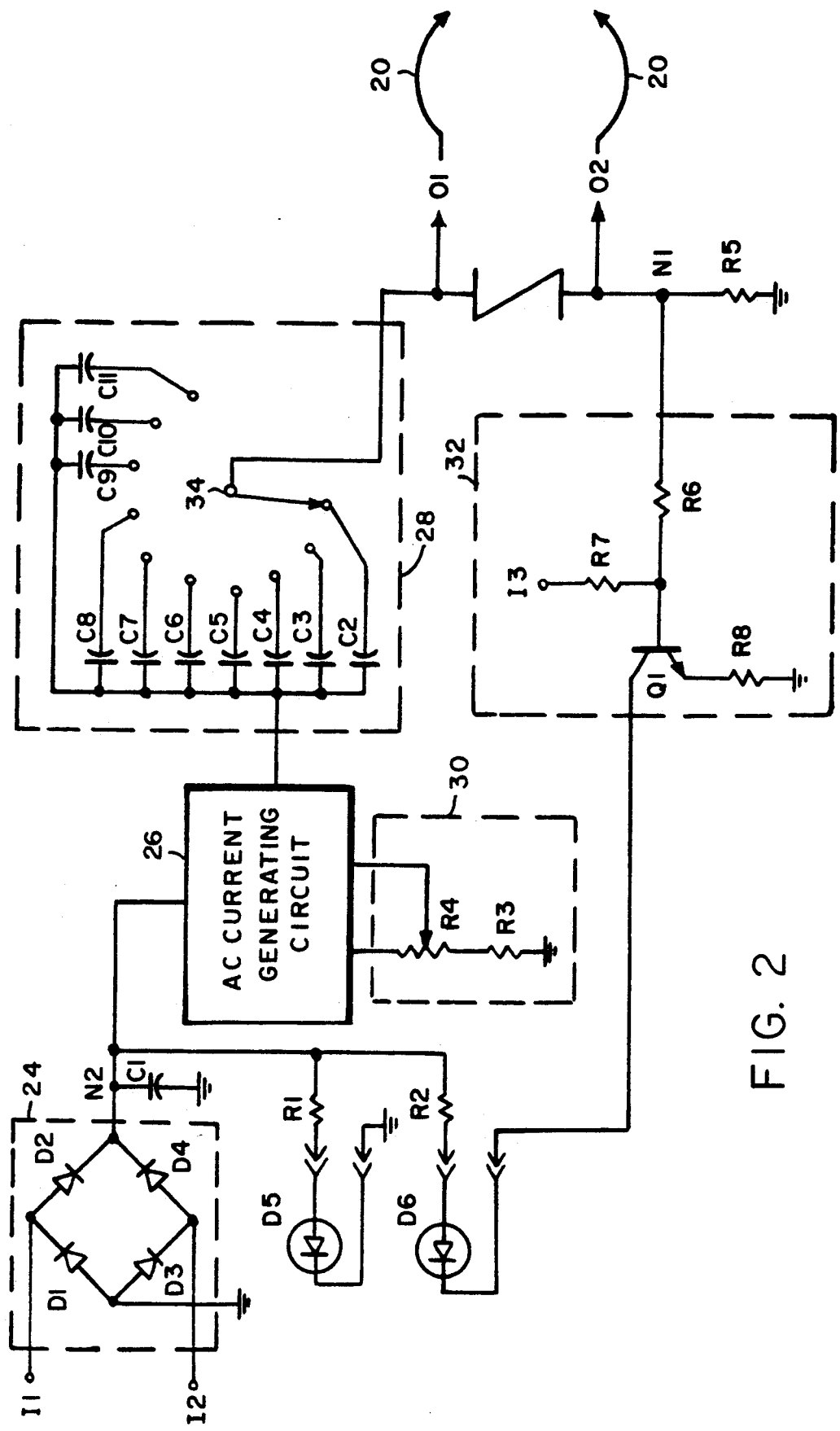
FIG. 2 is a schematic diagram of a transmitter circuit, particularly illustrating the tuning circuit portion, in accordance with the teachings of the present invention.

FIG. 2 illustrates a preferred embodiment of the transmitter circuit of the present invention which includes bridge rectifier circuit 24, two light-emitting diodes D5 and D6, AC current generator circuit 26, tuning circuit 28, range setting circuit 30, two output nodes O1 and O2 leading to the loop of electrical wire 20, and voltage sensing circuit 32. The transmitter circuit may be plugged into a standard wall outlet, receiving 115 volts AC, which is fed through a transformer to produce 12 volts AC at one half of an amp of current. This current comes in through input nodes I1 and I2 and is received by bridge rectifier circuit 24 having diodes D1 through D4. In a preferred embodiment of the present invention, bridge rectifier circuit 24 is arranged to produce 15 volts DC. It is to be appreciated, however, that bridge rectifier circuit 24 may be designed to produce a different power level. During operation, capacitor C1 is charged when the voltage level at node $N_2$ is greater than the potential or charge across the capacitor and discharges when the voltage level at node N2 falls below the charge across capacitor C1. This serves to level out the waveform outputted by bridge rectifier circuit 24. In a preferred embodiment of the present invention, capacitor C1 has a value of 3,300$\mu$ Farads.

When the transmitter circuit is powered, bridge rectifier circuit 24 feeds power through resistor R1 to power indicating light-emitting diode D5. This causes light-emitting diode D5 to illuminate, indicating to a user that the transmitter circuit has been powered.

DC voltage is also fed into AC current generating circuit 26 which produces AC current. The AC current produced by AC current generating circuit 26 has a selected amplitude and frequency. In a preferred embodiment of the present invention, the AC current generating circuit 26 includes an audio frequency oscillator which produces AC current at an 7.8 kHz frequency. AC current generating circuit 26 also includes a power amplifier for amplifying the amplitude of the AC current generated by the audio frequency oscillator. Both the audio frequency oscillator and the power amplifier are powered with the 15 volts DC which is inputted to the AC current generating circuit 26.

This AC current is fed through tuning circuit 28 to loop of electrical wire 20. The intensity of the AC current generated can be adjusted by potentiometer R4 which forms a voltage divider at the input of the power amplifier. Potentiometer R4 can be manually adjusted and ranges from zero ohms to the value of resistor R4. In a preferred embodiment of the present invention, resistor R3 has a value of 1 k ohms and potentiometer R4 has a value of 10 k ohms. It is to be appreciated, however, that the values of resistor R3 and potentiometer R4 can be any resistive values to accommodate different current generating circuits for specific applications.

The electrical wire loop 20, as illustrated in FIGS. 1 and 2, is connected to the transmitter circuit at output nodes O1 and O2. The AC current is fed through tuning circuit 28 to the loop of electrical wire 20. As aforementioned, the tuning circuit 28 provides for offsetting the inductive reactance portion of the impedance in electrical wire 20. The loop of electrical wire acts as an inductor. The impedance in the wire loop can be represented by the equation:

$$Z_{loop} = Z_R + Z_L + Z_C,$$

where:

$Z_R$ = the resistive portion of impedance in the loop;
$Z_L$ = the inductive reactance portion of impedance in the loop; and
$Z_C$ = the capacitive reactance portion of the impedance in the loop.

The resistive portion is a function of the length and cross-sectional diameter of the wire, and is independent of loop shape. For the embodiment shown, the capacitive reactance is essentially grounded and can be ignored. The inductive reactance portion is related to the frequency of the AC current and is both loop shape and loop size dependent. It is well known that capacitive impedance has a sign opposite that of inductive impedance. Therefore, when a capacitor is placed in series with the loop, the impedances add linearly, and the net reactance is diminished.

When a capacitor is placed in series with such a loop, a series RLC circuit is obtained. The impedance of such an RLC circuit is represented by the equation:

$$Z_{ckt} = \sqrt{R^2 + \left(2\Pi fL - \frac{1}{2\pi fc}\right)^2},$$

where:
R = the resistive portion of loop impedance;
f = the frequency of AC current in the loop;
L = the value of loop inductance; and
c = the value of the series capacitor.

Therefore, there exists a capacitor such that the inductive reactance is completely offset and the net impedance is reduced to simply the resistive portion.

The value of the capacitor which produces this complete inductive reactance offset is the following:

$$C = \frac{1}{4\pi^2 f^2 L}$$

where:
C = the value of the capacitor;
L = the inductance of the loop; and
f = the frequency of the AC current generated by the transmitter.

As previously noted, loop inductance L is a function of both the size and shape of the loop 20. Because the size and shape of the loop 20 will change with different loop arrangements, the value of the inductance L will change as well. Therefore, the value of the tuning capacitor will be different for different loop arrangements. Tuning circuit 28 of the present invention provides an easy method for selecting the capacitor which will provide the greatest reactance offset (i.e., will minimize the loop impedance).

Voltage sensing circuit 32 both senses and provides an indication of the amplitude of AC current in loop 20 by permitting current to flow through loop light-emitting diode D6 for a duration of time related to the amplitude of AC current in the loop. Transistor Q1 is turned on for a duration of time when the amplitude of AC current in the loop is greater than a threshold level. Transistor Q1 acts as a voltage dependent switch. When transistor Q1 is turned on, during which time the amplitude of AC current in the loop is greater than a threshold level, the open circuit between the collector and the emitter (indicated by an arrow) is closed. During this time, current is fed from node N2 through resistor R2 through loop light-emitting diode D6, through the collector and emitter, and finally through resistor R8 to ground. During this time, loop light-emitting diode D6 will illuminate in response thereto. When transistor Q1 is turned off, corresponding to a time period when the amplitude of AC current in the loop is less than a threshold level, an open circuit will appear between collector and emitter, thereby preventing current from running through loop light-emitting diode D6. Because the AC current in the loop is sinusoidal in nature, the transistor will turn on and off repeatedly in a cycle. Therefore, current will be fed through loop light-emitting diode D6 intermittently. As the amplitude of AC current in the loop is increased, the period of time during which transistor Q1 is turned on will also increase, which, in turn, will increase the duration of time during which current is fed through loop light-emitting diode D6. As a consequence, the brightness of loop light-emitting diode D6 will increase.

The threshold voltage level, at which transistor Q1 will turn on is set by the values of resistors R7 and R6. Input node I3 is biased at +5 volts which produces a voltage across resistor R7. The value of resistor R6 is much greater than the value of resistor R5. Resistor R5 is a current sensing resistor. The AC voltage at node N is proportional to the current in the loop. According to Ohm's Law, if R5 = 1 ohm and the current is 1 ampere, the voltage at node N1 is 1 volt. Therefore, as the AC current in the loop comes in through output node O2, most of the current is fed through resistor R5 to ground. A small portion of this current is fed through resistor R6 to the base of transistor Q1. As aforementioned, when the amplitude of this current reaches the threshold voltage level, as set by resistors R6 and R7, transistor Q1 will turn on. In a preferred embodiment of the present invention, resistor R5 has a value of 1.5 ohms, resistor R6 has a value of 220 ohms, and resistor R7 has a value of 2.2 k ohms.

Tuning circuit 28, in one embodiment as illustrated in FIG. 2, includes 10 capacitors, C2-C11, each having a different capacitance value, arranged in parallel. Rotary switch 34, which can be manually operated, allows for the electrical connection of any one of the 10 capacitors in series between AC current generating circuit 26 and loop 20. The optimal capacitor, of the 10 arranged in tuning circuit 28, can be selected with rotary switch 34 of tuning circuit 28, to offset the inductive reactance portion of impedance of loop 20 for any particular arrangement of loop 20.

The procedure one would follow to perform the tuning is as follows. After plugging in the transmitter circuit, and noting proper power has been received by observing power indicating light-emitting diode D5, one would adjust potentiometer R4. While adjusting potentiometer R4, loop light-emitting diode D6 is observed. As the wiper of potentiometer R4 is moved upward, AC current generating circuit 26 generates more AC current and the brightness in loop light-emitting diode D6 increases. Potentiometer R4 is initially adjusted such that the loop light-emitting diode D6 is at an intermediate level of brightness, to allow for subsequent tuning of tuning circuit 28. At this point, rotary switch 34 of tuning circuit 28 is adjusted while observing loop light-emitting diode D6. As rotary switch 34 is turned, through the ten positions, the brightness of loop light-emitting diode D6 varies. When the optimal capacitor is electrically connected, corresponding to one position of rotary switch 34, loop light-emitting diode D6 is at its brightest level. At this point, the user should leave rotary switch 34 in that position, and the optimal tuning capacitor for that particular loop arrangement will be connected. It is this capacitor which provides for the greatest inductive reactance offset in loop 20. With proper selection of the tuning capacitors, the selected switch setting should result in a near total offset of the inductive reactance in the loop.

It is also to be appreciated that, while in a preferred embodiment of the present invention, loop light-emitting diode D6 is used to indicate the level of AC current in loop 20, any current measuring element such as a volt meter, speaker, or the like may be used to indicated the level of AC current.

Similarly, while in a preferred embodiment rotary switch 34 and an arrangement of 10 capacitors in parallel, are used to tune the circuit to an optimal capacitance value, it is to be appreciated that another types of switches, preferably manual switches, might be used in a suitable tuner and that a variable capacitor, or an electrical switch with a feedback arrangement, may be used alternately. In addition, capacitors may be arranged in series and/or in parallel such that one or more of the capacitors may be selectively connected into the circuit at once. It is noted that when capacitors are connected in parallel, their capacitive values add linearly while when capacitors are connected in series, their values decrease.

While this invention has been described with reference to a preferred embodiment for use with a specific transmitter circuit, it is to be appreciated that this invention may be utilized with any type of AC generating circuit which is fed into such a loop 20. Again, the advantage stems from the fact that this circuit allows for the use of a wide range of sizes and arrangements of loops while avoiding the extra costs associated with the production of high AC currents.

While the invention has been particularly shown and described above with reference to a preferred embodiment, it is apparent that the foregoing and other changes in form and detail may be made therein by one skilled in the art without departing from the spirit and scope of the invention.

What is claimed is:

1. An animal confinement apparatus for confinement of an animal within a predetermined area comprising:
    a loop of electrical wire defining said predetermined area through which AC current is passed, said loop normally having an inductive impedance,
    a transmitter circuit for generating said AC current operatively connected to said loop,
    and a tuning circuit for eliminating most of the effective impedance of said loop by offsetting at least a substantial portion of the inductive impedance in said loop.

2. An animal confining apparatus as claimed in claim 1 wherein said tuning circuit includes means for providing a selected capacitive impedance in series with the loop.

3. An animal confining apparatus as claimed in claim 2 wherein said means for providing includes capacitor means operatively connected in series between said transmitter circuit and said loop, and means for varying the capacitance of said capacitor means.

4. An animal confinement apparatus as claimed in claim 3 wherein said capacitor means for providing includes a plurality of capacitors, each having a different capacitance value, and wherein said means for varying includes selector means for operatively connecting any one of said capacitors in series with said loop.

5. An animal confinement apparatus as claimed in claim 4 wherein said selector means includes a manual switch for operatively connecting any one of said capacitors in series with said loop.

6. An animal confinement apparatus as claimed in claim 4 wherein said tuning circuit further comprises a current measuring element operatively connected to said loop and an indicator responsive to said current measuring element for indicating the amount of AC current in said loop.

7. An animal confinement apparatus as claimed in claim 6 wherein said indicator includes a light-emitting diode.

8. A method for confinement of an animal with respect to a predetermined area comprising the steps of:
    generating an AC current;
    passing said AC current through a loop of electrical wire defining said predetermined area, said loop normally having an inductive impedance and being adapted to generate a magnetic field in response thereto,
    and eliminating most of the effective impedance of said loop by providing a selected capacitive impedance in series with said loop, said capacitive impedance being selected so as to offset at least a substantial portion of the inductive impedance in said loop.

9. A method for confinement of an animal as claimed in claim 8 wherein the step of providing capacitive impedance in series with said loop includes the step of operatively connecting a selected one of a plurality of capacitors of different capacitive values in series between said transmitter circuit and said loop.

10. A method for confinement of an animal as claimed in claim 9 wherein the step of operatively connecting includes the steps of observing an indicator element adapted to indicate the level of AC current in the loop, and operating a manual switch adapted to connect any one of said plurality of capacitors in series between said transmitter circuit and said loop, and selecting the setting of said switch for which the observed AC current in the loop is maximized.

11. Apparatus for providing a magnetic field at the perimeter of a predetermined area comprising:
    a loop of an electrical conductor laid out around the perimeter of said predetermined area, said loop normally having an inductive impedance; and
    a transmitter circuit for generating an AC current and for causing said AC current to flow through said loop, said transmitter circuit including a tuning circuit for eliminating most of the effective impedance of said loop by offsetting at least a substantial portion of said inductive impedance.

12. Apparatus as claimed in claim 11 wherein said tuning circuit provides a selected capacitive impedance in series with said loop.

13. Apparatus as claimed in claim 12 wherein said tuning circuit includes a variable capacitor means the capacitive impedance of which may be varied to have a predetermined relationship to said inductive impedance.

14. Apparatus as claimed in claim 13 including means for indicating the AC current flowing through said loop, said variable capacitor means being adjustable so as to maximize said AC current.

15. Apparatus as claimed in claim 14 wherein said means for indicating includes means for measuring the AC current flowing in said loop, and means for providing a sensory indication of the measured current.

16. A method for providing a magnetic field at the perimeter of a predetermined area comprising the steps of:

generating an AC current;

applying said AC current to flow through a loop of an electrical conductor laid out around the perimeter of said predetermined area; and eliminating most of the effective impedance of said loop by providing a selected capacitive impedance in series with said loop, said capacitive impedance being selected so as to offset at least a substantial portion of the inductive impedance in said loop.

* * * * *